No. 761,275. PATENTED MAY 31, 1904.
L. WALLACE.
APPARATUS FOR MOLDING BLOCKS FOR FENCE POSTS.
APPLICATION FILED FEB. 20, 1904.
NO MODEL. 7 SHEETS—SHEET 1.

No. 761,275. PATENTED MAY 31, 1904.
L. WALLACE.
APPARATUS FOR MOLDING BLOCKS FOR FENCE POSTS.
APPLICATION FILED FEB. 20, 1904.
NO MODEL. 7 SHEETS—SHEET 2.
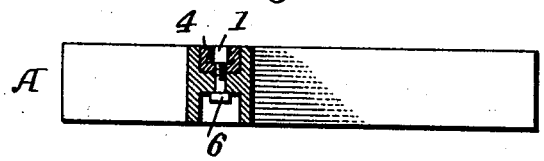
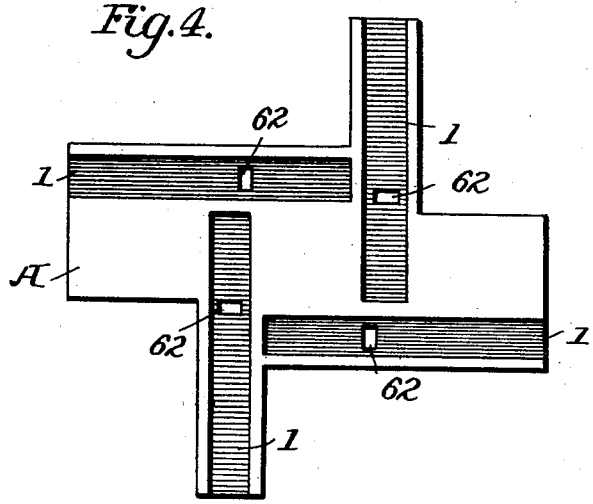
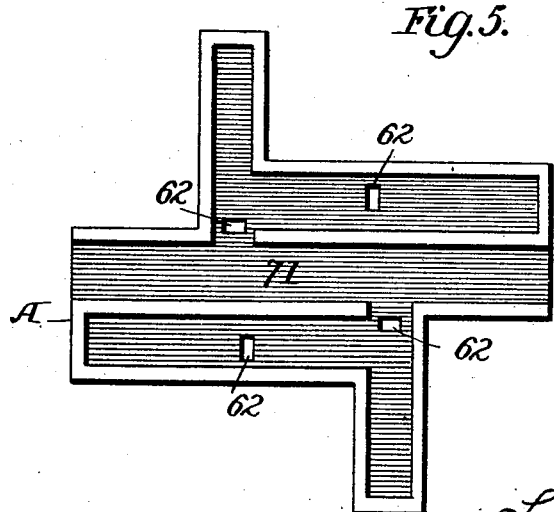
Witnesses
J. G. Hinkel
G. N. Freeman
Inventor
Lewis Wallace
by Foster, Freeman & Watson
Attorneys No. 761,275. PATENTED MAY 31, 1904.
L. WALLACE.
APPARATUS FOR MOLDING BLOCKS FOR FENCE POSTS.
APPLICATION FILED FEB. 20, 1904.
NO MODEL. 7 SHEETS—SHEET 3.
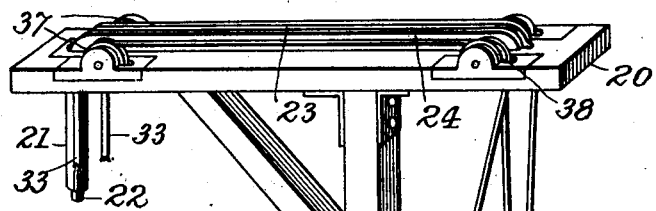
Fig. 6.
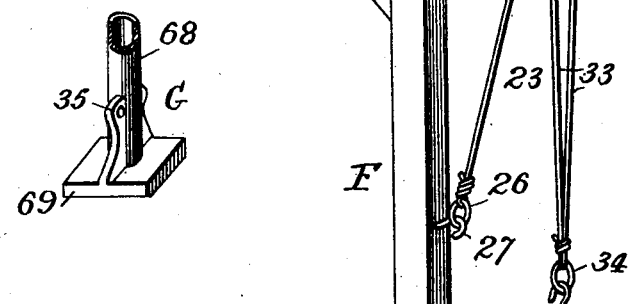
Fig. 8.
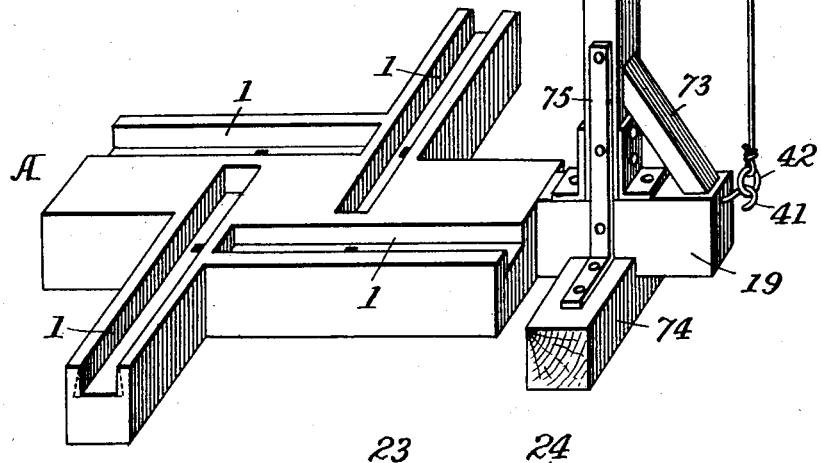
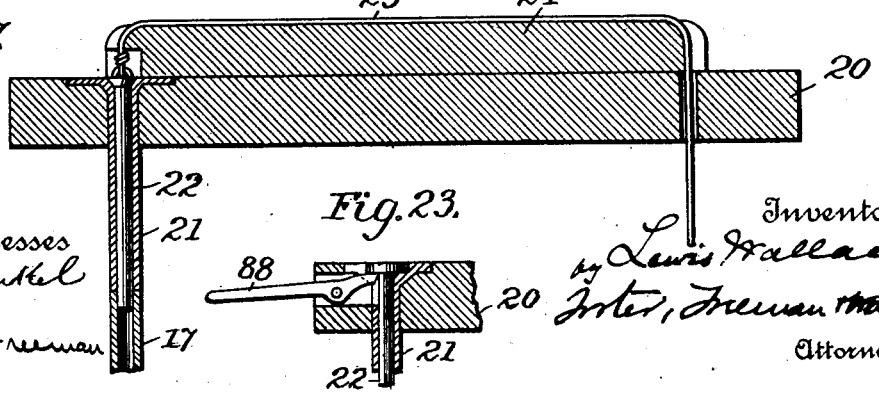
Fig. 7.
Fig. 23.
Witnesses
J. G. Stinkel
G. N. Freeman
Inventor
Lewis Wallace
by Foster, Freeman & ——
Attorneys
THE NORRIS PETERS CO., PHOTO-LITHO., WASHINGTON, D. C.

No. 761,275. PATENTED MAY 31, 1904.
L. WALLACE.
APPARATUS FOR MOLDING BLOCKS FOR FENCE POSTS.
APPLICATION FILED FEB. 20, 1904.
NO MODEL. 7 SHEETS—SHEET 4.
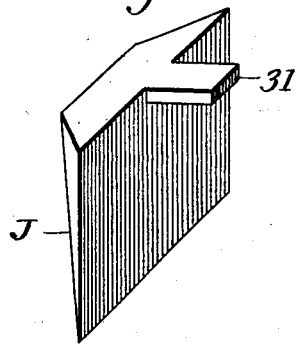
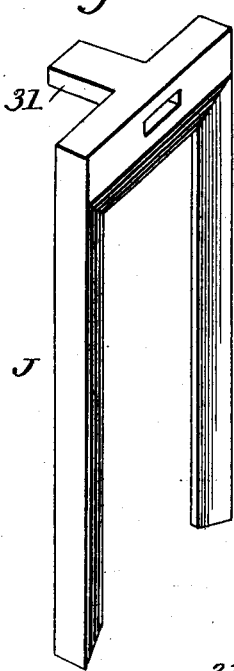
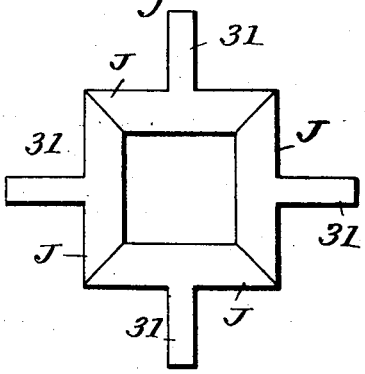
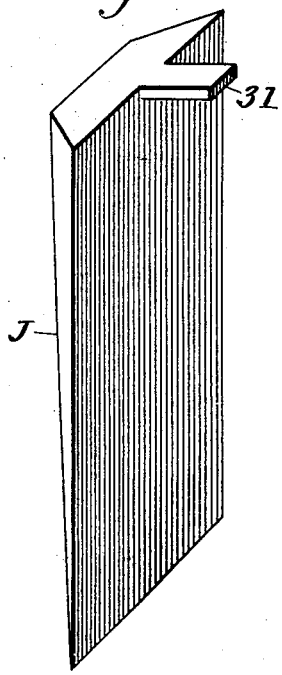
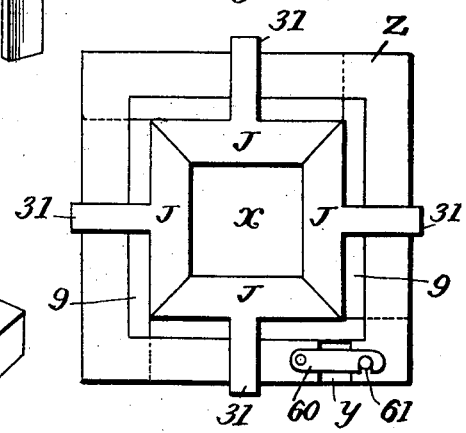
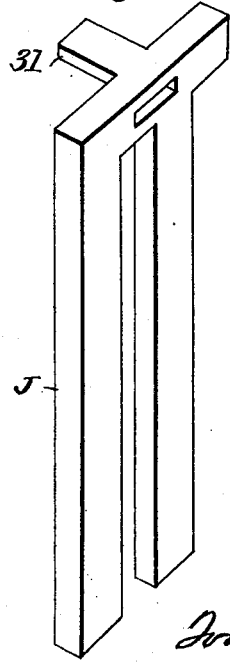
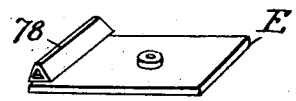

No. 761,275. PATENTED MAY 31, 1904.
L. WALLACE.
APPARATUS FOR MOLDING BLOCKS FOR FENCE POSTS.
APPLICATION FILED FEB. 20, 1904.
NO MODEL. 7 SHEETS—SHEET 5.
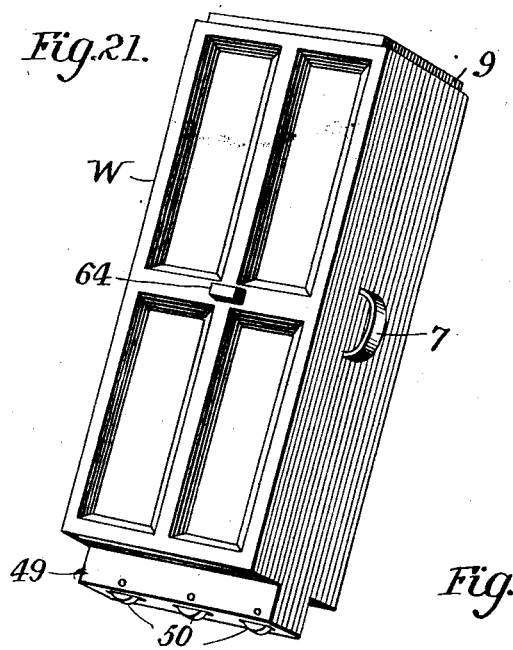
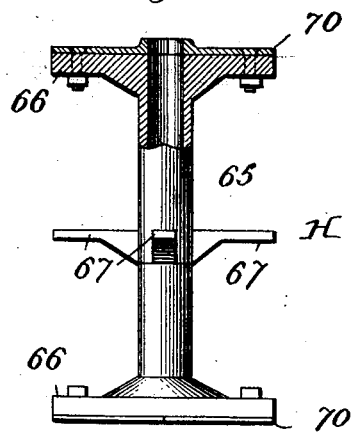
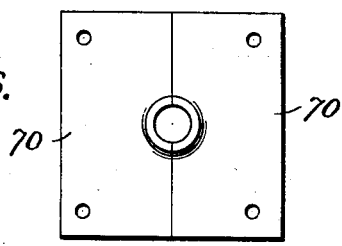
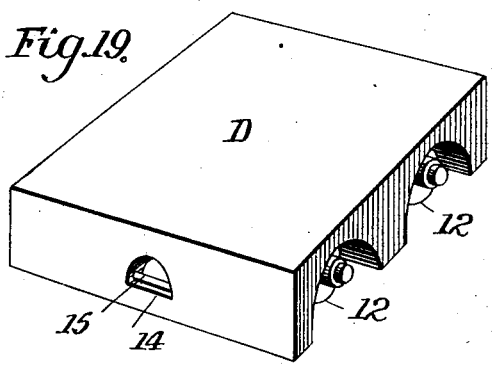
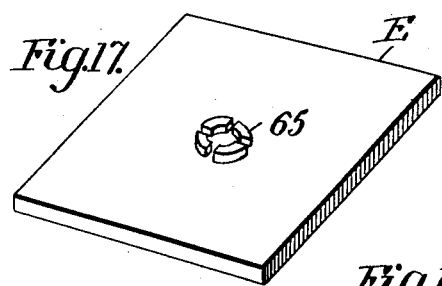
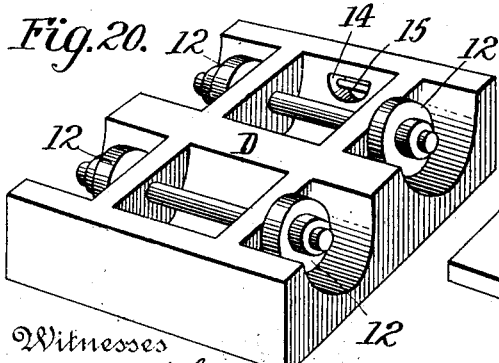
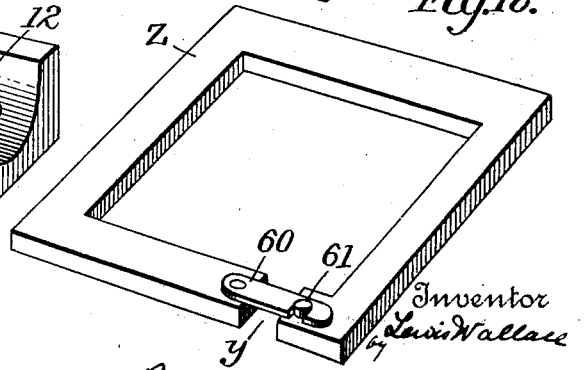

No. 761,275. PATENTED MAY 31, 1904.
L. WALLACE.
APPARATUS FOR MOLDING BLOCKS FOR FENCE POSTS.
APPLICATION FILED FEB. 20, 1904.
NO MODEL. 7 SHEETS—SHEET 6.

Witnesses
Inventor
Lewis Wallace
Attorneys

No. 761,275. PATENTED MAY 31, 1904.
L. WALLACE.
APPARATUS FOR MOLDING BLOCKS FOR FENCE POSTS.
APPLICATION FILED FEB. 20, 1904.
NO MODEL. 7 SHEETS—SHEET 7.
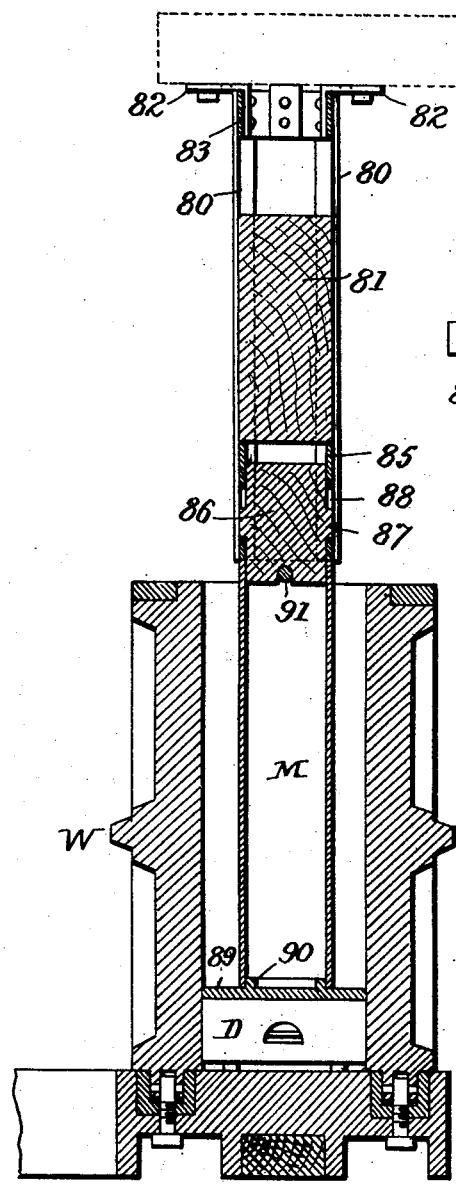
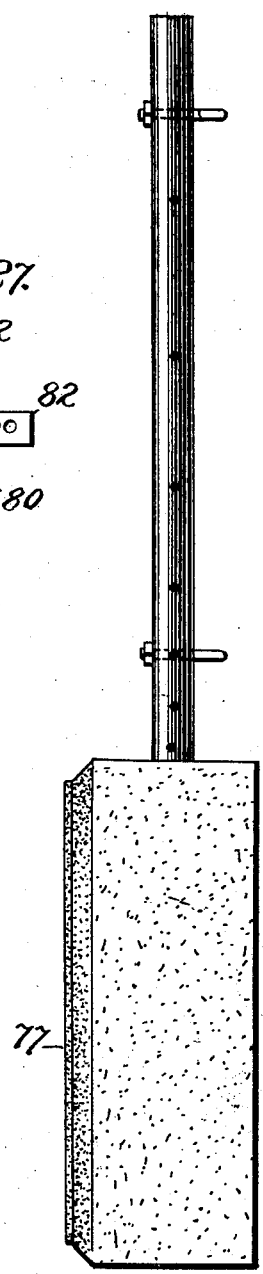

No. 761,275.

Patented May 31, 1904.

UNITED STATES PATENT OFFICE.

LEWIS WALLACE, OF CRAWFORDSVILLE, INDIANA.

APPARATUS FOR MOLDING BLOCKS FOR FENCE-POSTS.

SPECIFICATION forming part of Letters Patent No. 761,275, dated May 31, 1904.

Application filed February 20, 1904. Serial No. 194,566. (No model.)

*To all whom it may concern:*

Be it known that I, LEWIS WALLACE, a citizen of the United States, residing at Crawfordsville, in the county of Montgomery and State of Indiana, have invented certain new and useful Improvements in Apparatus for Molding Blocks for Fence-Posts, of which the following is a specification.

My invention relates to apparatus for molding blocks or plates of concrete or other suitable material, plain or colored, and in various forms and of any desired thickness and adapted to various purposes, but more particularly for molding blocks constituting bases for fence-posts or other standards which have to be supported in the ground; and my invention consists in the construction of the parts of an apparatus adapted for the above purposes, as fully set forth hereinafter and as illustrated in the accompanying drawings, in which—

Figure 1:
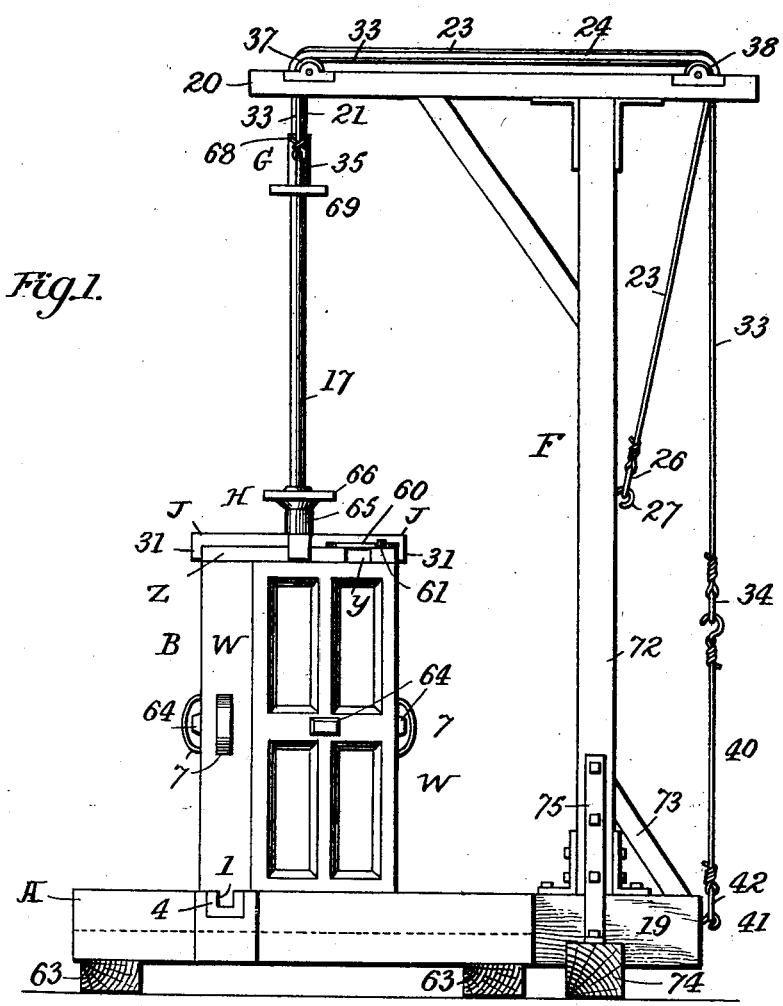
Figure 2:
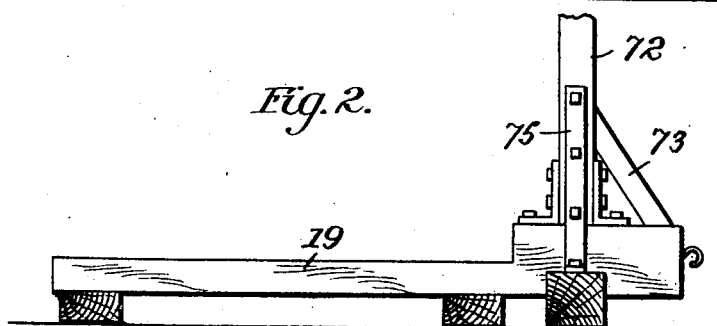
Figure 24:
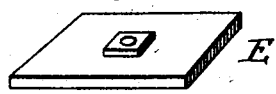
Figure 29:
Figure 30:
Figure 31:
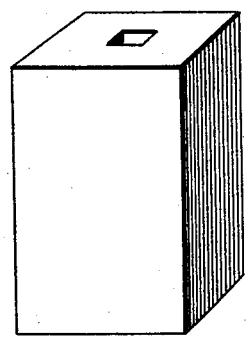
Figure 22:
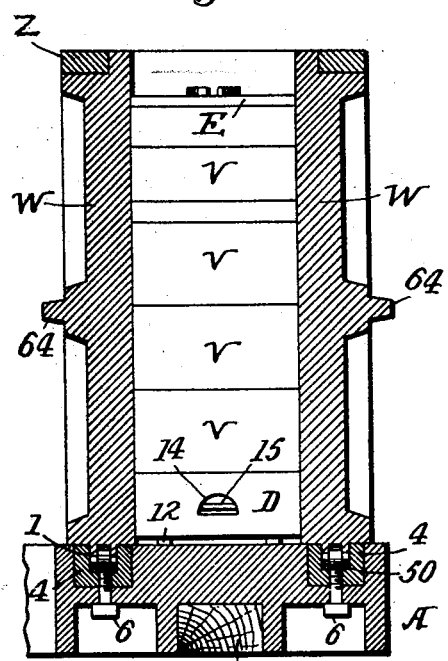

Figure 1 is an elevation illustrating one form of apparatus embodying my improvement. Fig. 2 is a detached view of the bottom beams and part of the standard of the crane. Fig. 3 is an edge view, in part section, of the base of the apparatus. Fig. 4 is a plan view of the base as constructed with portions removed to reduce weight. Fig. 5 is an inverted plan view of the base shown in Fig. 4. Fig. 6 is a perspective elevation of the apparatus, the mold removed. Fig. 7 is an enlarged longitudinal section of the top part of the crane of the apparatus. Fig, 8 is a perspective view, in part section, of one form of hammer. Figs. 9. 10, 11, and 14 are perspective views of different-shaped formers for insertion within the mold to shape the article molded therein. Fig. 12 is a plan showing four of the formers arranged in the position they occupy in the mold; Fig. 13, a plan view illustrating the mold with the formers and clamp or yoke for holding the mold-sections together. Fig. 15 is a part sectional view of a tamping-block; Fig. 16, a detached view of the reinforcing-plates of the clamping-block; Fig. 17, a perspective view of a centering plate; Fig. 18, a perspective view of the yoke or clamp; Fig. 19, a perspective view of the truck; Fig. 20, an inverted perspective view of the truck. Fig. 21 is a perspective view of one of the side pieces of the mold; Fig. 22, a view illustrating the use of filler-blocks for varying the length of the article molded; Fig. 23, a section showing a modified way of lifting the retaining-bolt; Fig. 24, a perspective view of the floor-plate; Fig. 25, a perspective view of the plate used with one of the formers; Fig. 26, a sectional elevation of the mold and guide-post required in molding hollow blocks; Fig. 27, a view showing the flanged brackets for attaching the guide-post of hollow blocks to the under side of the crane; Fig. 28, a view of a gate-post finished with block and eyebolts for hinging a gate to the post; Fig. 29, an elevation showing the block molded upon a corner-post with two rows of holes at right angles to receive the wires; Fig. 30, the same showing an intermediate post with one row of holes to receive the wires; Fig. 31, a perspective view illustrating one form of block which may be produced in the mold.

The machine is provided with a suitable base A, upon which rests a molding-box B, having separable sides, and for the purpose of condensing the mixture of concrete or other material within the box there is used a sliding hammer G, movable upon a guide 17, which may be part of a metal post, the lower end of which is embedded in the block, the said post being supported at its upper end by supports upon a crane F, which also supports means for reciprocating the hammer.

With this general statement of the arrangement and purpose of these parts I will now set forth the details of the different features of the structure.

The base A is of any suitable material, preferably of cast-iron, and has in its upper face grooves 1 1 1 1 at right angles to each other, as best shown in Figs. 4 and 6, each groove extending inward from one of the outer edges and nearly meeting another groove at right angles about midway between the ends of the same. These grooves may be made in the face of the base A, or to secure better finish they may be in strips 4, of brass or other suitable composition, fitting grooves in the base and secured by suitable bolts 6 or otherwise, as illustrated in Fig. 3. The object of these grooves is to receive and guide ribs 49 at the lower ends of the side pieces W of the molding-box B, these pieces being so proportioned that when their ribs are placed in said grooves, with the edge of one piece bearing against the side of the next piece, one at right angles to the other, there will be formed a closed molding-chamber $x$, as shown in Fig. 13, and in order to secure the sides in place when they are thus arranged I employ a suitable clamp Z, Figs. 1 and 18, which, as shown, is a rectangular frame adapted to inclose ribs 9, projecting from the upper ends of the sides. As this clamp must in some instances be applied when the rod 17 is in place, I form a slot $y$ at one side of the clamp to permit it to pass the said rod and provide a link 60, pivoted at one end at one side of the slot and having near the opposite end a notch to receive a pin 61, at the opposite side of the slot to complete the continuity of the clamp after it has inclosed the rod 17.

The ribs 49 at the bottom of the sides are adapted to fit nicely the grooves 1, and where it is desired to prevent the sides from being displaced vertically after being put in position the said grooves may be dovetailed, as shown in dotted lines, Fig. 6, the ribs 49 being of corresponding shape.

As the sides B when, as preferable, they are of metal will be heavy, their manipulation may be facilitated by providing them with ball or roller bearings 50, projecting slightly below the lower faces of the ribs.

The weight of the sides W and also the weight of the base A may be reduced by paneling the same, as illustrated in the drawings, Figs. 21 and 5 exhibiting the character of the panels of the sides and at the under side of the base, and the corners of the latter may be also cut away to remove superfluous portions, as shown in Fig. 4, and to permit the escape of dust, moisture, &c., from the grooves 1 and prevent them from being clogged in any way each is provided with an outlet-opening 62, extending through the base-plate. In this case the base-plate is best supported on cross-pieces 63, raising the lower face away from the foundation. To further facilitate the manipulation of the side pieces, each may be provided with a handle 7 at the outer edge.

As the removal of the side plates after a block has been molded can be better effected after tapping the said plates, I provide each with a projection 64, arranged at the center, where the blows may be best struck.

To facilitate the removal of the molded block, I mold the same upon a movable truck D of such dimensions as to fit nicely within the mold when the side pieces are brought together, and this truck is provided at the under side with suitable rollers 12, Figs. 19 and 20, and at one edge with a recess 14, having a cross-pin 15, to which may be applied a hook for drawing the truck, with the block resting upon it, to any desired position.

As it is not desirable to mold the block directly upon the face of the truck, I place upon the latter a centering-plate E, Fig. 17, having a recessed projection 65 at the center of its upper face, forming a socket, into which may be inserted the lower end of the rod 17, which is preferably hollow and which in many instances will constitute a post, around the lower end of which the block is to be molded.

From the base A the truck bearing the molded block in the green state is drawn off along a suitable tramway, a strip or strips being inserted as fillers in the grooves 1 to permit the truck to pass over the latter, and when the block reaches the proper position it is lifted, with the centering-plate adhering to it, by a movable crane or derrick and deposited in any suitable position for drying, the truck being returned for use in subsequent operations.

While the rod 17 may be supported at the upper end in any suitable manner, I have shown, Figs. 6 and 7, a tube 21 flanged at the upper end and extending downward through the cross-piece 20 of the crane and provided with a sliding bolt 22, having a beveled head fitting a countersink at the top of the tube, the lower end of the bolt projecting below the lower end of the tube, so as to enter the top of the tubular rod or post 17.

To facilitate the locking and unlocking of the post or rod, I provide means for shifting the bolt 22. Thus a cord 23 may extend from the upper end of the bolt over a grooved strip 24 on the cross-piece 20 and provided at the lower end with a ring 26 for engaging a staple 27 on the crane F when the bolt is to be held in an elevated position. Any other means, however, that may be found desirable for shifting the bolt may be employed.

To compact the material which is deposited in the mold, I make use of the hammer G and guide the same upon the rod or post 17. While the said hammer may be constructed in any suitable manner, a desirable form is illustrated in Fig. 8, consisting of a hollow stem 68 and base 69, corresponding in its shape and dimensions to the interior of the mold, hammers of different sizes being used for different-sized blocks.

Where the block is so short that a hammer of great length would be required, I may make use of an intervening tamping-block H, placed in the mold upon the material, the top of which is struck by the hammer. Such a tamping-block is shown in Fig. 15, consisting of a hollow stem 65 and end pieces 66, and where this block is of great length it may be provided with intermediate radially-projecting arms 67. The tamping-block may be reinforced at each end by iron plates 70 bolted in place, each notched at the inner edge to coincide with the opening in the stem. (See Fig. 16.)

The crane may be supported, in connection with the base A in any suitable manner; but, as shown, there is a groove 71, Fig. 5, in the bottom face of the base adapted to receive the reduced portion of a beam 19, Fig. 2, and on the thicker projecting end of the latter is erected the upright post 72 of the crane F, as shown. The standard 72 is supported in part by angle-pieces 73, bolted to the beam 19 and to the standard, and a further support is secured by notching the beam 19 to receive a cross-piece 74, to which and to the standard are bolted angle-pieces 75, as shown in Fig. 2.

In many instances it is desirable that the block shall have a taper, as shown in Figs. 29 or 30, and in order to avoid the necessity of using molds with side pieces W of different forms I make use of formers J of different shapes and proportions. As shown, each former consists of a plate adapted to fit the inner face of one of the side pieces B and provided at the upper end with a hook or projection 31, which rests upon the upper edge of the side piece and prevents the further descent of the former inside the mold, and the side edges of the former are beveled, so as to fit together within the mold, as illustrated in the plan views Figs. 12 and 13. In Figs. 9 and 10 the two figures illustrate formers of different lengths, and when in place the formers give the desired taper to the entire length of the block, as shown in Fig. 30, or to the top of the block only, as shown in Fig. 29.

The hammer may be raised and lowered in any suitable manner; but I prefer to make use of cables or ropes 33, Fig. 6, united to a handle 34 and at the opposite ends connected to eyepieces 35 at the top of the hammer and on the opposite sides of the opening through which the post 17 passes. Each cable passes upward through the cross-piece 20, over a pulley 37 back to and over another pulley 38 and downward through an opening in the cross-piece to the handle 34, by pulling which the hammer can be lifted and then released, so as to fall upon the tamping-block or inside the mold.

In order to hold the hammer in an elevated position when the parts of the mold are being brought together and while the mold is being filled and the post secured, I make use of a rod or cord 40, secured to the beam 19 and provided with a hook 41 for engaging the handle 42 of the rod.

Where it is not desired to make a block of the full length of the mold or where shallow pieces have to be molded, the greater portion of the mold may be filled up with filler-blocks V, as shown in Fig. 22, leaving only sufficient space to provide for the desired thickness of material.

When the post is intended to support a swinging gate, it may be provided with eye-bolts 80, passed through the same and secured by nuts 90, as shown in Fig. 25, these eye-bolts being secured in place after the molding of the base. In such case the opposite post is to be provided with an iron bar or other projection to catch the gate when swinging to and hold it.

It will of course be understood that where the block is not to be molded upon the post a suitable guide-post 17 is to be used instead and is removable after the block has been molded.

After the molding has been done, whether of a block, gate-post, intermediate fence-post, tile, or fractional block, the hammer is raised and secured, the formers (when used) removed, and the side plates of the mold slid outward in their grooves, a filler-block is inserted in the front groove, and the truck, with the floor or centering-plate and the finished product upon it, is removed from the mold, the filler-block permitting the wheels of the truck to cross the groove without obstruction or jar. The product, whatever its kind, is then drawn off along the tramway prepared for the truck to a suitable place and left to harden, or in case of some compositions it may be subjected to an increased temperature for drying or hardening.

While I have shown a rectangular mold, it will be evident that the mold may be of any desired shape in order to form triangular, octangular, or other shaped products. It will be evident also that the different means may be employed for securing the sides of the mold in position and for withdrawing them, as well as for bolting and centering posts when used and for operating the hammer. It will be seen, too, that by the use of formers of the proper shape in the mold circular blocks can be constructed, and by fluting the inner faces of the formers the product, whether square, circular, or of any shape, may be fluted as taste may dictate.

Instead of using cords the bolt 22 may be lifted by a lever 88, as in Fig. 23.

A block with a projecting paneled face 77, Fig. 28, may be formed when ornamentation is desired by using a beveling-frame J for a former, as in Fig. 11, the bottom slat of the frame being a separable piece, with a slot at each end to receive tongues in the corresponding lower ends of the side slats of the frame, or the bottom slat of the frame may be a permanent part 78 of the plate E, as shown in Fig. 25, or the block may have ribs and recesses, as shown in Fig. 14, J being one of the ribs. In the latter the ribs are intended to leave square depressions, and the spaces left by the ribs are to form raised surfaces. In both cases the former is to be inserted in the mold against the front side plate or that one out of which the truck is to be drawn, and to reduce the weight of this latter former the ribs J J should be hollowed, leaving walls not thicker than a quarter of an inch.

In Fig. 14 is represented a former with ribs J, which may be varied as taste requires. The ribs are intended to leave square depressions, and the spaces left by the ribs are to form raised surfaces. The outer surfaces of the ribs are to rest against the inner face of the front side plate. With these is used a hammer shortened on its fore side to correspond with the depth of the ribs of the former.

To make a hollow block using the same machine, I use a guide-post consisting of angle-irons 80, Figs. 26, 27, for corners, screwed to a wooden block 81, forming a post of suitable size, which will reach from the under side of the crane nearly to the top of the hollow core M. This guide-post is to be attached at its top to the under side of the crane by bolts or screws passing through the flanges of brackets 82, riveted to cross-plates 83, secured inside the angle-irons 80. To save the trouble of removing the tube 21 used, as before described, in making fence, corner, and gate posts, the guide 81 is made hollow at the top, so that it may be put in place, inclosing the tube 21. The angle-irons 80 are connected at the bottom by plates 85, forming a box, in which is a movable metal or wooden block 86, designed to connect the guide-post and the core M by dropping into the upper end of the core. To disconnect the post and the core when the block is finished, the plug is lifted, by means of a projection 87, flush with the outer face of the box and sliding in a slot 88. The tamping-hammer must of course conform to the shape and size of the guide-post.

Fig. 26 shows the floor-plate 89 used in centering the hollow guide-post, the lower end of the core M receiving the projection 90. When the block is finished, the core M is drawn out of the box before opening the side plates. To facilitate the withdrawal, it has a cross-bar 91, and the block 86 is recessed to straddle the bar when dropped.

Without limiting myself to the precise construction and arrangement of parts shown and described, I claim—

1. In a machine for molding bases, blocks, &c., the combination of a mold having separable sides, a base on which the mold is detachably supported, means for temporarily supporting a rod in position above the mold, a hammer sliding on the rod, and means for raising and releasing the hammer, substantially as set forth.

2. In a machine for molding bases, blocks, &c., the combination of a mold having separable sides, a base on which the mold is detachably supported, means for temporarily supporting a rod in position above the mold, a hammer sliding on the rod, means for raising and releasing the hammer, and a tamping-block recessed to receive the rod and fitting the interior of the mold, substantially as set forth.

3. The combination with a mold having separable sides and reciprocating hammer, of a rod constituting a guide for the hammer, and means for supporting the rod to permit its ready removal, substantially as set forth.

4. The combination with a mold having separable sides and reciprocating hammer, of a rod constituting a guide for the hammer, means for supporting the rod, and a former fitted detachably within the mold at one side thereof and having a face with projections to mold the side face of the block formed in the mold, substantially as set forth.

5. In an apparatus for molding bases upon fence-posts, the combination of a sectional mold, means for temporarily supporting a rod in position in the mold and so as to extend beyond the same, a hammer sliding upon said rod, and means for raising and releasing it, substantially as set forth.

6. In an apparatus for molding bases upon fence-posts, the combination of a sectional mold, means for temporarily supporting a post in position in the mold and so as to extend beyond the same, a hammer sliding on said post, means for raising and releasing it, and a tamping-block recessed to receive the post and fitting the interior of the mold, substantially as set forth.

7. The combination of a sectional mold, means for locking a rod in place so as to extend through and out of the mold, a sliding hammer, and tamping-block adapted to enter the mold and recessed to receive the rod, substantially a set forth.

8. The combination of a sectional mold, means for supporting a rod, a sliding hammer, and a former fitted to the upper part of the mold and conforming interiorly to the shape of the outer part of the base to be molded, substantially as described.

9. The combination of a sectional mold, a support for a rod, a hammer, and a former consisting of sections fitted detachably to each other and to the inner part of the mold, substantially as set forth.

10. The combination of the base, a mold detachably supported thereon, a crane, means supported by the crane for centering a rod above the mold, and a beam projecting from the base and serving as a bearing for the standard of the crane, substantially as set forth.

11. The combination of the base, a mold detachably supported thereon, a crane, means supported by the crane for centering a rod above the mold, a beam projecting from the base and serving as a bearing for the standard of the crane, and a cross-piece and brackets for bracing said standard, substantially as set forth.

12. The combination of the base, its grooves or channels 1, at right angles to each other, and openings 62 extending through the base and communicating with the channels, substantially as set forth.

13. The combination of the base, having grooves or channels 1, at right angles to each other and provided with a groove in its lower face to receive a beam, a beam fitting the groove, and a crane supported on said beam, substantially as set forth.

14. The combination of a sectional mold, a rod, means for centering the lower end of the rod in the mold, a standard having an arm or cross-piece extending over the mold, and a bolt for retaining the upper end of the post supported by the cross-piece, and means for operating the bolt, substantially as described.

15. The combination in a machine for molding blocks, of a sectional mold consisting of a series of side plates fitted to each other, a base having grooves for receiving the lower edges of the side plates, a yoke or securing device for binding the upper ends of the side plates together, a reciprocating hammer, and means for guiding the same, substantially as set forth.

16. The combination of a base having grooves or recesses arranged at right angles to each other, side plates, with projections adapted to said grooves, and a yoke adapted to hold the side plates in place when brought together to inclose a chamber open at the upper end, substantially as set forth.

17. The combination of the side plates and a base-plate having grooves adapted to receive ribs at the lower ends of the side plates, and antifriction-rollers projecting below said ribs, substantially as set forth.

18. The combination of a base having grooves in its upper face and side plates sliding in said grooves at their lower ends and provided with handles at their outer edges, and a yoke for holding the side plates together, substantially as set forth.

19. The combination with a grooved base and side plates constituting a sectional mold, of a truck supported by the base and fitting the lower part of the mold, substantially as set forth.

20. The combination of a sectional mold and base-plate, means for centering the upper end of a rod so as to extend above the mold, and a centering-plate fitted in the mold and adapted to center and support the lower end of the rod, substantially as described.

21. The combination of a base-plate having grooves in its upper face, and side plates fitted at their lower ends to said grooves and provided with antifriction-rollers, substantially as set forth.

22. The combination of the base, sectional mold supported thereby, crane, hammer, rod arranged above the mold, for guiding the hammer, and detachable filler-blocks adapted to the mold, substantially as set forth.

In testimony whereof I have signed my name to this specification in the presence of two subscribing witnesses.

LEWIS WALLACE.

Witnesses:
　GEORGE F. McGINNIS,
　WILLIAM T. FLETCHER.